United States Patent [19]

Fujita

[11] 4,263,658
[45] Apr. 21, 1981

[54] ELECTRONIC APPARATUS CAPABLE OF STORING OPERATIONAL SEQUENCE

[75] Inventor: Takayuki Fujita, Kawasaki, Japan

[73] Assignee: Canon Kabushiki Kaisha, Tokyo, Japan

[21] Appl. No.: 22,142

[22] Filed: Mar. 20, 1979

[30] Foreign Application Priority Data

Mar. 28, 1978 [JP] Japan ................................. 53-35656

[51] Int. Cl.³ ............................................. G06F 3/023
[52] U.S. Cl. ..................................... 364/709; 364/900
[58] Field of Search .......................... 364/709, 200, 900

[56] References Cited

U.S. PATENT DOCUMENTS

| | | | |
|---|---|---|---|
| 3,764,993 | 10/1973 | Lettieri | 364/900 |
| 3,858,799 | 1/1975 | Yoshio et al. | 364/709 |
| 3,932,838 | 1/1976 | Sitter | 364/900 X |
| 4,079,234 | 3/1978 | Kashio | 364/900 X |
| 4,099,246 | 7/1978 | Osborne et al. | 364/709 |

*Primary Examiner*—David H. Malzahn
*Attorney, Agent, or Firm*—Fitzpatrick, Cella, Harper & Scinto

[57] ABSTRACT

Electronic apparatus having a mode setting switch, keys for keying in information, a memory for storing information to be processed entered by the keys and the mode setting switch, and provisions for controlling the memory to accept information from the mode setting switch only when changes are made in such mode information.

4 Claims, 3 Drawing Figures

ELECTRONIC APPARATUS CAPABLE OF STORING OPERATIONAL SEQUENCE

BACKGROUND OF THE INVENTION

1. Field of the Invention

The present invention relates to electronic apparatus provided with a mode setting switch and being capable of preventing misoperation in a device such as a calculator. For example, in a calculator and the like a misoperation occurs sometimes when key codes once stored in a key buffer are derived from the key buffer to process the key codes. The present invention is directed to a solution of such problem by storing also the operational status of the mode setting switch at the time when the key entry was made.

2. Description of the Prior Art

In view of size, desk-top calculators are classified into three groups, that is, small type, middle type and large type calculators. Generally, the small type calculator is not provided with a key buffer and thus the input of a key is valid only when the control phase is just in a status of waiting for reading-in of the key information. However, the middle and large type calculators are provided with a buffer memory in which information of successive keying is stored for a time. Such key information stored in the buffer memory can be derived from it later at any desired time. In this case, there is a time lag between the input of information by keying and the derivation of the key information. In such type of calculators, there may be used a mode setting switch for setting various modes of operation for processing the input data, and the combination use of the status of the mode setting switch and the key information are designed to provide various different functions. In this case, since there is a time lag between the time when the input of information is entered by keys and the time when the derivation of the key information is made, and the status of the mode setting switch will be changed during the time, the status of the mode setting switch at the time when the key information is derived from the buffer will be different from that at the time when the key information is entered.

The above fact gives some inconvenience for such type of calculator which has various different functions in accordance with different combinations of the status of a mode setting switch and the keys. Sometimes, the calculator will function differently from what the operator expects at that time.

SUMMARY OF THE INVENTION

Accordingly, it is a general object of the invention to provide electronic apparatus which is able to reproduce the status of the mode setting switch at the time when key information was entered by storing information of change of status of the mode setting switch also in the key buffer and by executing the processing of the input data in accordance with the input information.

Other and further objects, features and advantages of the invention will appear more fully from the following description taken in connection with the accompanying drawing.

DESCRIPTION OF THE PREFERRED EMBODIMENTS

Figure 1:
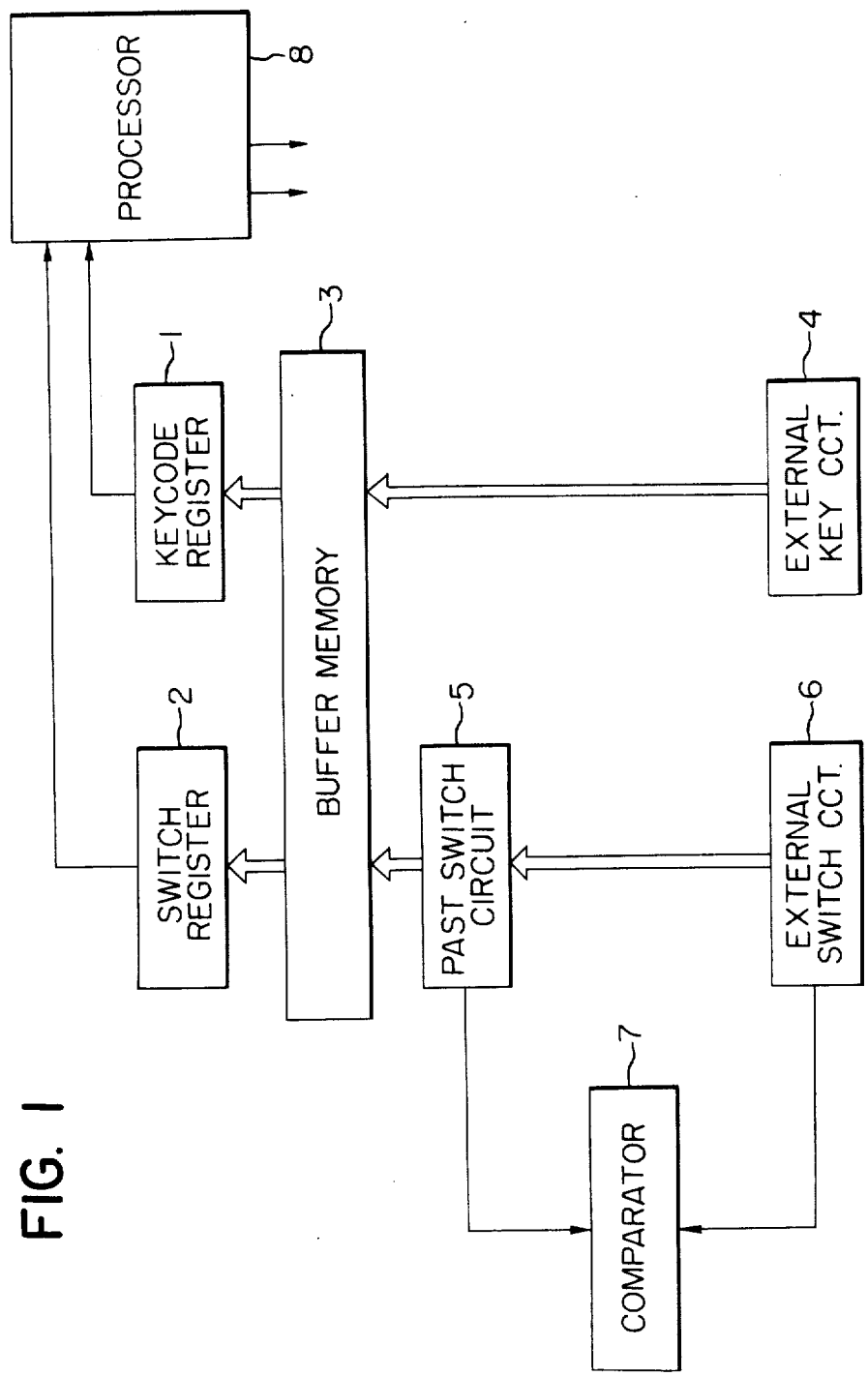
FIG. 1 is a block diagram showing a preferred embodiment of the invention.

In FIG. 1 showing an embodiment of the invention, the reference numeral 1 designates a 7-bit key code register to which a processor 8 can refer without limitation. 2 is a switch register used to reproduce various positions of a mode setting switch. The processor 8 can refer also to the switch register 2 without any limitation. Designated by 3 is an input information buffer memory for buffering key information as well as information of the mode setting switch. 4 is an external key circuit which generates output signals relating to the 7-bit key code under keying and relating to an interruption signal for informing whether or not keying is completed. The interruption signal becomes "1" when a new keying is completed and it is turned to "0" in response to a read-out signal. 5 is a register for holding information of the positions which the mode setting switch has once taken. 6 is an external switch circuit which generates signals of the mode setting switch. 7 is a comparator for comparing the content of 5 with that of 6 to check whether any change has taken in the position of the switch or not.

The above mentioned mode setting switch may be, for example, a print selection switch or program selection switch.

Figure 2:
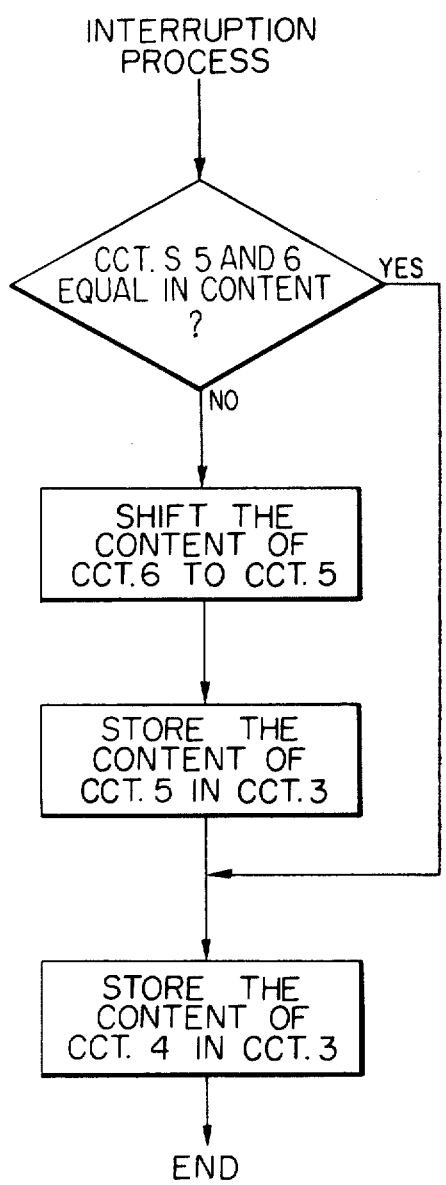
FIG. 2 is a flow chart showing the manner of control for an interruption process in accordance with the principle of the invention.

Every time when the mode setting switch is operated, information thereof is stored for the time in the buffer memory 3 through the switch circuits 6 and 5. Also, the key information is stored in the memory 3 one by one in the order of keying through the key circuit 4. The key information is transferred from the memory 3 to the processor 8 in a regular order of "first in, first out" through the key code register 1. At the same time, the switch information once stored is transferred from the memory 3 to the processor 8 in a similar manner through the switch register 2. In this manner, data processing is performed in a correct order corresponding to the order of key input of the data. Therefore, it is no longer necessary for the operator to worry about whether the order is correct or not. This ensures the operator to operate the apparatus smoothly and at ease. Furthermore, by storing new information of the mode setting switch in the buffer memory 3 in parallel to the previously stored information only when there appeared some change in the information of the switch, an economical use of the buffer memory can be attained. In deriving the switch information, first stored switch information is first derived from the memory 3 through the register 2 for data processing. FIG. 2 is a flow chart showing an example of such control procedure.

In FIG. 2, a new keying makes the key circuit 4 generate a 7-bit key code. The most significant bit, namely interruption demand bit turns up to high level and demands an interruption process of the processor 8. In replying to this demand, the processor 8 starts excuting the interruption processing program shown in FIG. 2.

In the first place, the comparator 7 compares the content of the past switch circuit 5 with that of the external switch circuit 6. When the answer is "No", that is, when the latter content is different from the former, the content of the switch circuit 6 is shifted to the circuit 5. Then, it is stored in the key buffer 3. So long as the switch information remains unchanged, no switch information is added in the key buffer 3. This prevents the key buffer from being wasted.

In order to differentiate the switch information from the key code information in the key buffer 3, the former has "1" given to the most significant bit of 8 bits in total whereas the latter has "0". Transferring the data into the key buffer is effected in a manner known per se.

Figure 3:
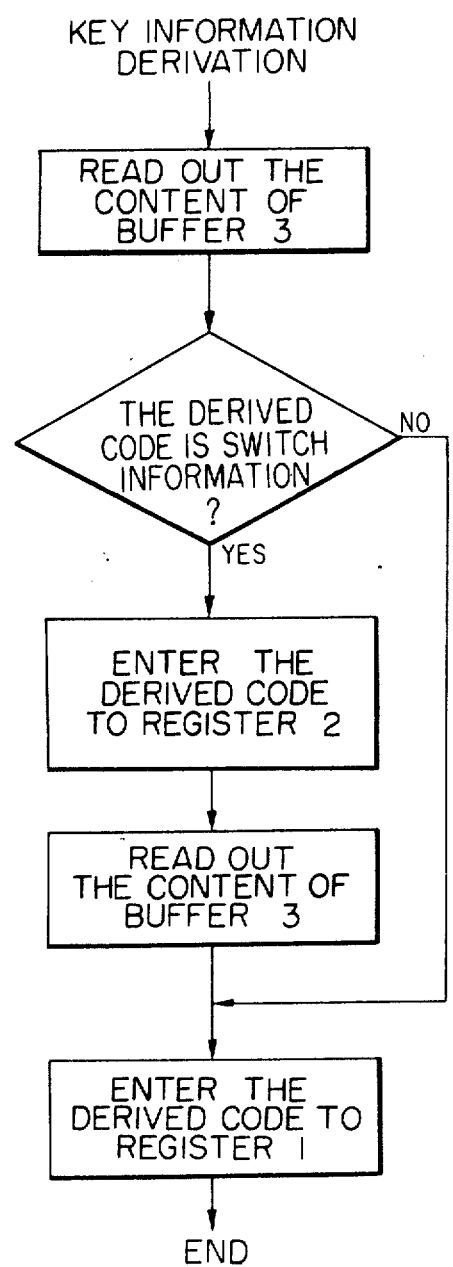
FIG. 3 is another flow chart showing the manner of deriving key information in accordance with the invention.

The processor 8 can take up, when necessary, from the corresponding registers the key code information and the switch information related to the key code information in accordance with the program shown in FIG. 3. The switch register 2 is rewritten only when switch information is derived therefrom. Therefore, the register 2 continues holding the same switch information so long as no switch information takes off from it.

As will be understood from the foregoing, with the electronic apparatus in accordance with the invention, key information can be taken up from the key buffer while reproducing the position of the switch in which the information was once put in the apparatus. Therefore, the operator can carry out the necessary processing of data while considering the key code register 1 to be the key circuit 4 and the switch register 2 to be the switch circuit 6. This has a great effect on the minimization of operation errors by the operator as well as by the apparatus itself. Since during processing neither the switch register 2 nor the key code register 1 undergoes any change, the operator can go on processing at ease.

What I claim is:

1. An electronic apparatus comprising:
   mode setting means, and keyboard input means having a plurality of input keys for entering information;
   mode memory means coupled to said mode setting means for storing mode information;
   input information memory means coupled to said keyboard input means and said mode memory means for storing the operation sequence of said input keys and information set by said mode setting means;
   comparing means coupled to said mode setting means and said mode memory means for comparing the mode information from said mode setting means and the mode information stored in said mode memory means; and
   control means coupled to said input information memory means and responsive to the operation of any one of said input keys for controlling said input information memory means to store the content of said mode memory means and the signal produced by the operation of the input keys, for controlling said mode memory means to refresh the mode information from said mode setting means when said comparing means detects incoincidence of information from said mode setting means and said mode memory means, and for controlling said mode memory means to retain the previous contents thereof, and said input information memory means to store a signal produced by the operation of the input key, when said comparing means detects the coincidence of said mode setting means and said mode memory means.

2. An electronic apparatus according to claim 1, further comprising means for reading out the operation sequence stored in said input information memory means, and a first register coupled to said reading out means for storing the mode information from said input information memory means.

3. An electronic apparatus according to claim 2, further comprising a second register coupled to said reading out means for storing input key information read out from said input information memory means.

4. An electronic apparatus according to claim 3, further comprising means coupled to said first and second registers for processing the key information entered from said second register in accordance with the mode information from said first register.

* * * * *